Figure 1:
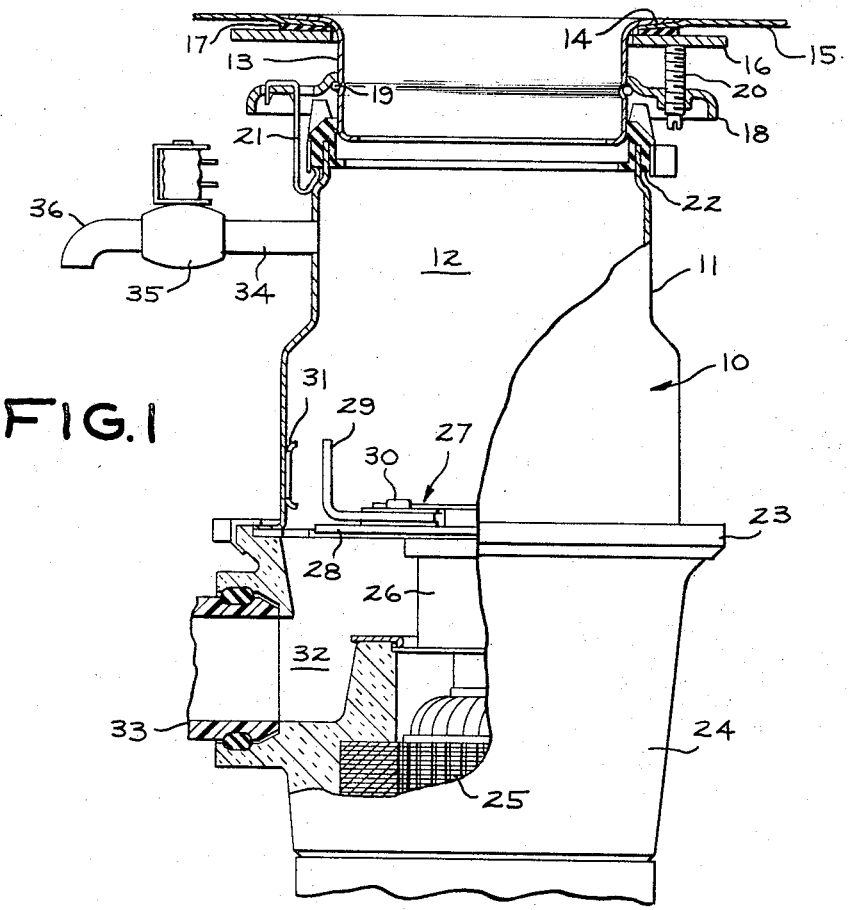

Aug. 15, 1967        J. E. EGLE        3,335,969

CONTROL MEANS FOR A FOOD WASTE DISPOSER

Filed Oct. 31, 1963

INVENTOR.
JOHN E. EGLE
BY James E. Espe
HIS ATTORNEY

United States Patent Office 3,335,969
Patented Aug. 15, 1967

3,335,969
CONTROL MEANS FOR A FOOD WASTE DISPOSER
John E. Egle, Georgetown, Ind., assignor to General Electric Company, a corporation of New York
Filed Oct. 31, 1963, Ser. No. 320,360
8 Claims. (Cl. 241—36)

This invention relates generally to food waste disposers and, more specifically, to a control means to automatically de-energize a food waste disposer when the food waste being comminuted has been depleted.

It is often difficult for the average housewife, when operating a domestic food waste disposer, to determine when the food waste has been completely comminuted and the disposer should be turned off. One reason for this is that the food waste being comminuted is essentially hidden within the disposer so that one cannot visibly determine its depletion. It is sometimes possible to determine the depletion of food waste within a disposer by the change in sound made by the disposer as the food waste is depleted; however, this change in sound is, on occasion, so gradual that only a trained ear can detect it. Also, many disposer manufacturers intentionally insulate and cushion their food waste disposers to minimize the generation of noise which increases the difficulty of audibly detecting the depletion of food waste. Accordingly, it would be desirable to provide, in a food waste disposer, a device to automatically de-energize the disposer when the food waste being comminuted has been depleted.

Since it is customary to admit water to the food waste disposer during comminuting operation, it would be convenient to have a device which will automatically shut off the supply of water and de-energize the disposer as the food waste is depleted. Additionally, to assist the exceptionally hard of hearing individual, an indicator means would be desirable to visibly indicate the de-energization of the food waste disposer.

Therefore, it is an object of this invention to provide an automatic shut off device for a food waste disposer.

Another object of this invention is to provide, in a food waste disposer, a device which will automatically de-energize the disposer when the food waste being comminuted has been depleted.

A further object of this invention is to provide, in a food waste disposer, an automatic shut off device having means to visibly indicate to the operator that the disposer has been shut off.

A further object of this invention is to provide a food waste disposer with a device which will de-energize the disposer and shut off the water supply thereto automatically when the food waste being comminuted has been depleted.

Briefly stated, in accordance with one aspect of the invention, there is provided a food waste disposer having a comminuting assembly, an electric motor to drive the comminuting assembly and a speed responsive means driven by the motor. The speed responsive means is effective to de-energize the motor when the motor exceeds a predetermined speed. The comminuting assembly prevents the motor from exceeding the predetermined speed as long as food waste is being comminuted. Therefore, when the food waste has been depleted, the comminuting assembly allows the motor to speed up in excess of the predetermined speed so that the speed responsive means may de-energize the motor.

In one specific embodiment of the present invention, a visible indicator means is associated with the speed responsive means to visibly indicate when the motor has been de-energized. In a second specific embodiment of the present invention a valve, controlling the admission of water to the disposer, is arranged to be closed by the speed responsive means when the speed responsive means de-energizes the motor so that the water is automatically shut off contemporaneously with the de-energization of the motor.

Figure 2:
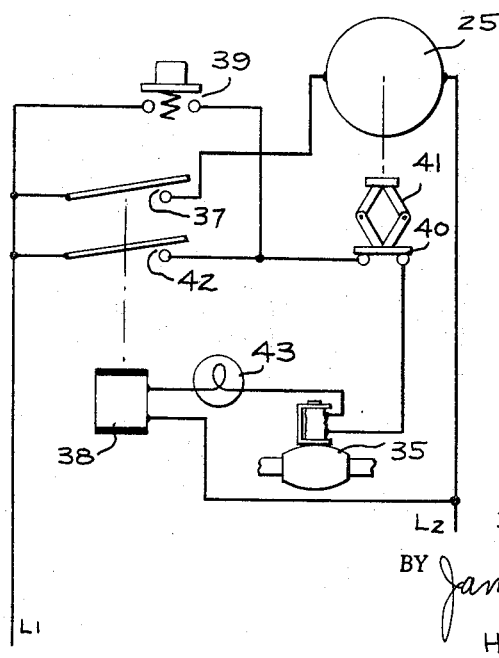

While the specification concludes with claims particularly pointing out and distinctly claiming the subject matter which is regarded as the invention, it is believed the invention will be better understood from the following description taken in connection with the accompanying drawings, in which:

FIGURE 1 is an elevation view, partially cut away to show details, of a food waste disposer utilizing the present invention; and FIGURE 2 is a schematic representation of the control circuit of the present invention.

Referring now to the drawings, and particularly to FIGURE 1, there is shown a food waste disposer 10 having a hopper 11 defining a comminuting chamber 12. The disposer 10 may be supported by any suitable means such as, for example, the assembly shown in FIGURE 1 which includes a sink flange 13 having a flanged top 14 which rests on a sink 15. A ring 16 is spaced from the bottom surface of sink 15 by a gasket 17. A clamping member 18 rests upon a snap ring 19 which is seated in an indentation in the outer surface of sink flange 13. A plurality of screws 20 are angularly spaced about the assembly and are threaded to the clamping member 18 such that, when the screws 20 are tightened, the sink flange 13, ring 16 and clamping member 18 are rigidly secured to the sink 15.

A plurality of clips 21 are angularly spaced about clamping member 18 and depend downwardly therefrom to engage a boot 22 which is securely fixed to the top of hopper 11. The resiliency provided by clips 21 and boot 22 tend to cushion the disposer 10 and minimize the transfer of vibrations from the disposer 10 to the sink 15. The sink connection assembly just described is more fully described and claimed in U.S. Patent 3,108,755, issued to Johnny W. Yartz and Francis J. Clements on Oct. 29, 1963, and which is assigned to the General Electric Company, the assignee of the present invention. It should be realized that this particular sink connection assembly is not critical to the present invention and, in fact, any suitable connection means may be employed.

Secured to the lower end of hopper 11 by means of a clamping ring 23 is a housing 24. Encapsulated within housing 24 is an electric motor 25 which is interconnected, through a bearing 26, to a comminuting assembly 27. The comminuting assembly 27 includes a flywheel 28 which rotates directly with motor 25. At least one impeller 29 is pivotally secured to the flywheel 28 by means of a pin 30. Secured to the inner wall of the hopper 11 in radially spaced relationship with impeller 29 is a grinding pad 31 which cooperates with the impeller 29 to effect a comminuting action within chamber 12. As is well known in the food waste disposer art, motor 25 rotates and drives comminuting assembly 27. Impeller 29 is pivoted radially outwardly as flywheel 28 rotates and each time that impeller 29 passes grinding pad 31 food waste within chamber 12 is comminuted.

During the comminution operation water is admitted to chamber 12 to facilitate the comminuting action and also to wash the comminuted food waste from chamber 12 into drainage chamber 32 from where it is carried to a conventional sewer system by means of a conduit 33. The water may be admitted to chamber 12 through the sink flange 13 as is quite often done in domestic installations; however, if desired, water may be admitted to the chamber 12 through the side wall of hopper 11 as illustrated in FIGURE 1. To achieve the admission of water through the side wall of hopper 11, a water conduit 34 interconnects chamber 11 with an electrically operated valve 35. The valve 35 is connected to a conventional household water source (not shown) by means of conduit 36.

As mentioned earlier, the present invention is particularly concerned with a control means for a food waste disposer and, therefore, many of the features thus far discussed with respect to the food waste disposer per se are not critical to the present invention and may be modified without materially affecting the invention.

As shown in FIGURE 2, the electric motor 25 is connected, through a control system to be more fully hereinafter discussed, to power lines $L_1$ and $L_2$ which in an ordinary installation may represent a power source of 115 volts at 60 cycles. As can be seen from FIGURE 2, when switch 37 is closed, motor 25 is energized. Switch 37 is operated by an electrically responsive operator 38 in such a manner that when power is provided to operator 38 switch 37 is closed. A manually operable switch 39, which is spring loaded to the open position, is in series with the operator 38. Also in electrical series circuit with the operator 38 is a switch 40 which is operated by a speed responsive device 41. A switch 42 is in electrical series with switch 40 and is in electrical parallel with switch 39 and, moreover, is operated by operator 38 in a manner identical to that of switch 37. With this arrangement, it can be seen that when switch 39 is manually closed, current passes through the normally closed switch 40 to energize the electrically responsive operator 38. As operator 38 is energized, switches 37 and 42 are closed. As switch 37 closes, motor 25 is energized and the food waste disposer 10 begins its comminuting action. Also, as switch 42 is closed there is no longer any need for switch 39 to remain closed since switch 42 is in parallel with switch 39. Therefore, once the motor 25 has been energized the operator may release switch 39 which will return to its normally open position and, since switch 42 is maintained in its closed position by operator 38, operator 38 will remain energized and switch 37 will remain closed.

The situation just described obtains until all of the food waste in chamber 12 is comminuted. As the food waste is depleted, the load on motor 25, impressed thereon by comminuting assembly 27, is decreased. As the load decreases, motor 25 speeds up and, since speed responsive device 41 is responsive to the speed of motor 25, when a predetermined speed is exceeded device 41 opens switch 40. As this occurs, it is obvious that the electrically responsive operator 38 will be de-energized and switches 37 and 42 will return to their normally open position. As switch 37 opens, motor 25 is de-energized thereby effecting a shut-off of the food waste disposer 10.

As previously mentioned, it would be desirable under certain circumstances to automatically discontinue the admission of water to the chamber 12 simultaneously with the de-energization of the motor 25. To accomplish this, the electrically operated valve 35 may be in electrical series with switch 40 such that the valve 35 is de-energized (closed) at the same time that the electrically responsive operator 38 opens switch 37 to de-energize the motor 25. Obviously, therefore, the water being admitted to chamber 12 is terminated at the same time that the motor 25 is de-energized as a result of the depletion of food waste in chamber 12. It should be realized that valve 35 may be connected in electrical series with motor 25 to accomplish the same objective.

If desired, a visible indicator means 43 also may be positioned in electrical series with switch 40, or motor 25, such that the operator of the disposer 10 can visibly determine when the disposer is energized.

As should be obvious from the description of the invention thus far, electric motor 25 must be of the type whose speed varies inversely with the load applied thereto. In other words, motor 25 must be load sensitive such that the speed of the motor is significantly reduced when a load is applied thereto. In this case, the load is applied in the form of food waste interacting with the comminuting assembly 27. In the preferred form of the present invention, a series wound electric motor is employed; however, any load responsive motor may be employed.

It should also be realized that the electrically operated valve 35 need not necessarily be in direct communication with chamber 12 as is shown in FIGURE 1 in the form of water conduit 34. It would clearly be within the scope of the present invention to have the electrically operated valve 35 positioned above the sink flange 13 such that water may enter chamber 12 through sink flange 13 in a manner similar to a conventional kitchen faucet.

As will be evident from the foregoing description, certain aspects of the invention are not limited to the particular details of the construction of the example illustrated, and it is contemplated that various other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. A food waste disposer comprising:
   (a) a comminuting assembly,
   (b) an electric motor to drive said comminuting assembly, and
   (c) speed responsive means driven by said motor,
   (d) said speed responsive means being effective to de-energize said motor when said motor exceeds a predetermined speed,
   (e) said comminuting assembly preventing said motor from exceeding said predetermined speed as long as food waste is being comminuted.

2. The invention defined in claim 1 further comprising indicator means associated with said speed responsive means to visibily indicate the de-energization of said motor.

3. A food waste disposer comprising:
   (a) a comminuting assembly,
   (b) a series wound electric motor to drive said comminuting assembly, and
   (c) speed responsive means driven by said motor,
   (d) said speed responsive means being effective to de-energize said motor when said motor exceeds a predetermined speed,
   (e) said comminuating assembly preventing said motor from exceeding said predetermined speed as long as food waste is being comminuted.

4. A food waste disposer comprising:
   (a) a comminuting assembly,
   (b) an electric motor to drive said comminuting assembly,
   (c) speed responsive means driven by said motor, and
   (d) a switch in electric series circuit with said motor and being effective to de-energize said motor,
   (e) said speed responsive means adapted to actuate said switch to de-energize said motor when said motor exceeds a predetermined speed,
   (f) said comminuting assembly preventing said motor from exceeding said predetermined speed as long as food waste is being comminuted.

5. A food waste disposer comprising:
   (a) a comminuting assembly,
   (b) an electric motor to drive said comminuting assembly,
   (c) a manually operable switch effective to energize said motor, and
   (d) a speed responsive switch driven by said motor and being effective to de-energize said motor when said motor exceeds a predetermined speed,
   (e) said comminuting assembly preventing said motor from exceeding said predetermined speed as long as food waste is being comminuted.

6. A food waste disposer comprising:
   (a) a comminuting assembly, (b) an electric motor to drive said comminuting assembly,
(c) a motor switch to control operation of said motor,
(d) an electrically responsive operator to operate said motor switch,
(e) a manually operable start switch in electrical series circuit with said electrically responsive operator to energize said operator thereby to initiate operation of said motor, and
(f) a speed responsive switch in electrical series circuit with said start switch and said electrically responsive operator,
(g) said speed responsive switch being responsive to the speed of said motor to de-energize said operator when said motor exceeds a predetermined value to thereby de-energize said motor,
(h) said comminuting assembly preventing said motor from exceeding said predetermined speed as long as food waste is being comminuted.

7. A food waste disposer comprising:
(a) a comminuting assembly,
(b) an electric motor to drive said comminuting assembly,
(c) speed responsive means driven by said motor, and
(d) a valve to control the admission of water to said comminuting assembly,
(e) said speed responsive means being effective to de-energize said motor and to close said valve when said motor exceeds a predetermined speed,
(f) said comminuting assembly preventing said motor from exceeding said predetermined speed as long as food waste is being comminuted.

8. A food waste disposer comprising:
(a) a comminuting assembly,
(b) an electric motor to drive said comminuting assembly,
(c) a motor switch to control operation of said motor,
(d) an electrically operated valve to control the admission of water to said comminuting assembly,
(e) a motor switch to control operation of said motor,
(f) an electrically responsive operator to operate said motor switch,
(g) a manually operable start switch in electrical series circuit with said electrically responsive operator to energize said operator thereby to initiate operation of said motor,
(h) said start switch also being in electrical series circuit with said valve whereby said valve is opened to admit water to said comminuting assembly when said start switch is operated, and
(i) a speed responsive switch in electrical series circuit with said start switch, said electrically responsive operator and said valve,
(j) said speed responsive switch being responsive to the speed of said motor to de-energize said operator when said motor exceeds a predetermined value to thereby de-energize said motor,
(k) said comminuting assembly preventing said motor from exceeding said predetermined speed as long as food waste is being comminuted.

References Cited

UNITED STATES PATENTS

| | | | |
|---|---|---|---|
| 2,059,106 | 10/1936 | Hess | 241—36 |
| 2,550,281 | 4/1951 | Martin | 318—466 |
| 2,588,025 | 3/1952 | Margolin | 241—36 X |
| 2,750,121 | 6/1956 | Schmidt | 241—36 X |
| 2,900,140 | 8/1959 | Schumann | 241—36 |

WILLIAM W. DYER, JR., *Primary Examiner.*

ROBERT C. RIORDON, *Examiner.*

H. F. PEPPER, *Assistant Examiner.*